United States Patent
Schmid et al.

(10) Patent No.: US 7,233,288 B2
(45) Date of Patent: Jun. 19, 2007

(54) RECEIVER FOR A POSITION-FINDING SYSTEM WITH IMPROVED SENSITIVITY

(75) Inventors: Andreas Schmid, Duisburg (DE); André Neubauer, Krefeld (DE)

(73) Assignee: Infineon Technologies AG, Munich (DE)

( * ) Notice: Subject to any disclaimer, the term of this patent is extended or adjusted under 35 U.S.C. 154(b) by 74 days.

(21) Appl. No.: 11/174,211

(22) Filed: Jul. 1, 2005

(65) Prior Publication Data

US 2006/0012522 A1   Jan. 19, 2006

(30) Foreign Application Priority Data

Jul. 2, 2004   (DE) ...................... 10 2004 032 222

(51) Int. Cl.
   *G01S 3/02*   (2006.01)
(52) U.S. Cl. ........................ 342/464; 342/417; 342/443
(58) Field of Classification Search ................. 342/386, 342/443, 457, 463, 464, 417, 451; 455/24, 455/63.1, 500
   See application file for complete search history.

(56) References Cited

U.S. PATENT DOCUMENTS 7,106,251 B2 *   9/2006   Schmid et al. .............. 342/464

2006/0012523 A1   1/2006   Schmid et al. .............. 342/451

FOREIGN PATENT DOCUMENTS

DE   102 20 892 A1   12/2003
DE   102 49 296 A1   5/2004
DE   102004027666   2/2006

OTHER PUBLICATIONS

Kennemann, O., "Lokalisierung von Mobilstationen anhand ihrer Funkmssdaten", Verlag der Augustinus Buchhandlung, ISBN 3-86073-620-5, pp. 35-41, 63-81, 141-156, 1997.
Sumanasena et al., "Rice Factor Estimation Algorithm", in Electronic Letters, No. 14, pp. 918-919, 2001.

* cited by examiner

*Primary Examiner*—Dao L. Phan
(74) *Attorney, Agent, or Firm*—Baker Botts L.L.P.

(57)   ABSTRACT

A receiver (1) of a position-finding system comprises a calculation unit (6, 7, 8) for calculation of a statistical value ($\Lambda$) on the basis of a received signal, and a detector unit (9) for comparison of the statistical value ($\Lambda$) with a threshold value ($\kappa$) and for determining whether the received signal is a synchronized location signal, an estimation unit (10) for estimation of the Rice factor (K) of the radio link via which the received signal has been transmitted, and a determination unit for calculation of the threshold value ($\kappa$) on the basis of the Rice factor (K).

21 Claims, 11 Drawing Sheets

RECEIVER FOR A POSITION-FINDING SYSTEM WITH IMPROVED SENSITIVITY

CROSS REFERENCE TO RELATED APPLICATION

This application claims priority to German Patent Application No. 10 2004 032 222.8, which was filed on Jul. 2, 2004, and is incorporated herein by reference in its entirety.

TECHNICAL FIELD

The invention relates to a receiver for a position-finding system. The invention also relates to a method for finding the position of a receiver in a position-finding system.

BACKGROUND

It has been known for some time for position finding to be carried out on the basis of radio links, for example within the satellite-based GPS (Global Positioning System). The European satellite navigation system Galileo, as well as positioning methods based on terrestrial radio sources, offer further applications. Position-finding methods such as these and corresponding appliances allow the user to determine his position by measuring the distance to a specific number of wire-free signal sources such as satellites or base stations. By way of example, each GPS and Galileo satellite transmits unique digital sequences, which include a time identification and the satellite position. The signals are normally coded with long spread codes. The spread codes for the individual satellites are virtually orthogonal with respect to one another, so that the signals can be distinguished from one another in the receiver. By way of example, the spread codes of the various GPS and Galileo satellites are synchronized with respect to one another by means of high-precision atomic clocks which are installed in the satellites.

The receiver evaluates the relative delays between the signal transmission from different radio sources (GPS satellites, Galileo satellites or terrestrial transmitters), and uses these delays to determine the so-called delay time offsets. Together with the data relating to the position and the time reference of the various radio sources, the delay time offsets can be used in order to locate the receiver exactly. The receiver for this purpose calculates the so-called pseudo ranges, which represent the distance to each radio source. Navigation software can then calculate the user position on the basis of the pseudo range to each radio source and the position of the radio sources, by solving a set of non-linear equations.

The delay time offsets between the signals received from the radio sources are frequently measured by determining a correlation maximum in a receiver architecture and by assuming that this maximum corresponds to the direct line-of-sight path (LOS) with additive white Gaussian noise (AWGN). The problem is that the individual location signals do not always reach the receiver along a direct line-of-sight path, but are often reflected on a large number of obstructions such as buildings or hills. These reflected location signals travel over a longer path than the location signal which is propagating on the line-of-sight path before they are received by the receiver, and are thus delayed. In the case of this so-called multipath signal propagation, that is to say in which various versions of the location signal arrive at the receiver at different times, the delayed location signals are superimposed at the receiver antenna. Depending on the phase offset, the location signals are subject to constructive or destructive interference. Thus, depending on the transmission scenario, the amplitude and the phase of the received signal may be very different.

The reflection, diffraction and scatter of the location signals on obstructions also leads to attenuation of the location signals. This makes it harder to identify the signal in the receiver, in the event of multipath signal propagation.

The effects that have been mentioned require high receiver sensitivity in order to make it possible to reliably identify and synchronize location signals.

Many conventional modern receivers for position-finding systems are based on first of all despreading the sample values of the received signals and then subjecting them to coherent integration and non-coherent integration. The resultant statistical values are passed to a detector, for example a Neyman-Pearson detector, which maximizes the probability of identification of the location signals in accordance with the desired requirements.

The detector compares the statistical values supplied to it with a threshold value. Provided that a statistical value is greater than the threshold value, it is assumed that a location signal has been received. In the converse situation, the received signal is not classified as a location signal. This is intended to avoid signals which are not location signals being used for position finding. Furthermore, this method also prevents location signals with an excessively low reception amplitude being used for position finding. Modern receivers frequently have detectors which are optimized for additive white Gaussian noise.

SUMMARY

One object of the invention is to provide a receiver for a position-finding system, which is more sensitive than conventional receivers. A further object is to specify a corresponding method.

These objects can be achieved by a receiver for a position-finding system, which is based on the evaluation of different delay times of location signals, wherein the location signals are transmitted from two or more transmitters with known positions and being received by the receiver, the receiver comprising a calculation unit for calculation of a statistical value on the basis of a signal which is received by the receiver, a detector unit, which is designed such that it compares the statistical value with a threshold value and determines on the basis of the comparison whether the received signal is a location signal and/or whether the received signal is used for finding the position of the receiver, an estimation unit for estimation of the Rice factor of the radio link via which the received signal was transmitted, and a determination unit for determination of the threshold value on the basis of the estimated Rice factor.

The determination unit can be designed such that it calculates the probability density of the received, in particular preprocessed, signal on the basis of the estimated Rice factor, and that it calculates the threshold value on the basis of this probability density. The determination unit can also be designed such that it calculates the probability density of the received, in particular preprocessed, signal on the basis of the estimated Rice factor, and that it determines the threshold value on the basis of this probability density by means of a table. The determination unit can also be designed such that it determines the threshold value on the basis of the estimated Rice factor by means of a table. The determination unit can also be designed such that it calculates the threshold value on the basis of a predetermined fixed incorrect detection probability, with the incorrect detection probability being the probability that the received signal is not a synchronized location signal but is considered by the detector unit to be a location signal. In the calculation unit, sample values of the received signal may feed a series circuit which has a first integrator for coherent integration, a magnitude squaring or magnitude forming device and a second integrator for non-coherent integration. The location signals which are transmitted by the transmitters can be spread-coded, and a despreading unit can be provided in the calculation unit, for despreading the received signal. The estimation unit for estimation of the Rice factor can be fed with the statistical value from the calculation unit, or with the despread sample values from the despreading unit. The Rice factor can be estimated by the estimation unit using $$\hat{K}_s \approx \frac{\hat{E}\{R^2\} - 2 \cdot \hat{E}\{(R - \hat{E}\{R\})^2\}}{2 \cdot \hat{E}\{(R - \hat{E}\{R\})^2\}}$$

where R is the amplitude of sample values of the received signal, and $\hat{E}\{x\}$ is approximated by forming a running average of x. The Rice factor can also be estimated by the estimation unit using $$\hat{K}_{2,4} = \frac{\hat{E}\{R^4\} - 2 \cdot (\hat{E}\{R^2\})^2 - \hat{E}\{R^2\} \cdot \sqrt{2 \cdot (\hat{E}\{R^2\})^2 - \hat{E}\{R^4\}}}{(\hat{E}\{R^2\})^2 - \hat{E}\{R^4\}}$$

where R is the amplitude of sample values of the received signal, and $\hat{E}\{x\}$ is approximated by forming a running average of x. The transmitter of the position-finding system can be arranged on satellites or terrestrially.

The objects can also be achieved by a method for finding the position of a receiver in a position-finding system, which is based on the evaluation of different delay times of location signals, wherein the location signals are being transmitted by two or more transmitters with known positions, and being received by the receiver, the method comprising the steps of:
(a) calculating a statistical value on the basis of a signal which is received by the receiver;
(b) comparing the statistical value with a threshold value;
(c) determining on the basis of the result of the comparison whether the received signal is a location signal and/or whether the received signal is used for finding the position of the receiver,
(d) estimating the Rice factor of the radio link via which the received signal has been transmitted; and
(e) determining the threshold value on the basis of the estimated Rice factor.

The probability density of the received, in particular preprocessed, signal can be calculated on the basis of the estimated Rice factor in step (e), and the threshold value can be calculated on the basis of this probability density. The probability density of the received, in particular preprocessed, signal can be calculated on the basis of the estimated Rice factor in step (e), and the threshold value can be determined on the basis of this probability density by means of a table. The threshold value can be determined on the basis of the estimated Rice factor by means of a table in step (e). The threshold value can be calculated on the basis of a predetermined fixed incorrect detection probability, with the incorrect detection probability being the probability that the received signal is not a synchronized location signal but is considered in step (c) to be a location signal. Sample values of the received spread-coded signal can be despread in step (a), the despread sample values can be integrated coherently, the squares of the magnitudes of the results of the coherent integration can be formed, and the squares of the magnitudes can be integrated non-coherently. The Rice factor can be estimated on the basis of the statistical value or on the basis of despread sample values, or on the basis of coherently integrated despread sample values, or on the basis of the magnitude of coherently integrated despread sample values. The Rice factor can be estimated using $$\hat{K}_s \approx \frac{\hat{E}\{R^2\} - 2 \cdot \hat{E}\{(R - \hat{E}\{R\})^2\}}{2 \cdot \hat{E}\{(R - \hat{E}\{R\})^2\}}$$

where R is the amplitude of sample values of the received signal, and $\hat{E}\{x\}$ is approximated by forming a running average of x. The Rice factor can also be estimated using $$\hat{K}_{2,4} = \frac{\hat{E}\{R^4\} - 2 \cdot (\hat{E}\{R^2\})^2 - \hat{E}\{R^2\} \cdot \sqrt{2 \cdot (\hat{E}\{R^2\})^2 - \hat{E}\{R^4\}}}{(\hat{E}\{R^2\})^2 - \hat{E}\{R^4\}}$$

where R is the amplitude of sample values of the received signal, and $\hat{E}\{x\}$ is approximated by forming a running average of x. The transmitters of the position-finding system can be arranged on satellites or terrestrially.

The receiver according to the invention is a component of a position-finding system. The principle on which the position-finding system is based is the transmission of location signals from two or more transmitters, which are then received by the receiver. On the basis of a location signal that is received by it, the receiver can identify the transmitter from which the location signal was transmitted, and the time at which the location signal was transmitted. In the situation where the transmitters are not arranged in fixed positions, it is also possible to derive the location at which the relevant transmitter was situated at the time of transmission, from the location signal. Since the receiver knows the times at which location signals have been received from different transmitters, it can use the delay time differences between the individual location signals to determine its accurate position.

The receiver according to the invention has a calculation unit which calculates a statistical value from a received signal. The statistical value is passed to a detector unit, which compares the statistical value with a threshold value. The detector unit can use the result of this comparison to determine whether the received signal is a synchronized location signal. Furthermore, it is also possible to provide for the detector unit to use the threshold value comparison process that is carried out to decide whether a received location signal will be used to find the position of the receiver. Specifically, it is possible for the location signal to have been attenuated during the transmission from the transmitter to the receiver to such an extent that it can be distinguished only inadequately from noise when it is received.

Furthermore, the receiver according to the invention has an estimation unit and a determination unit.

The estimation unit is used to estimate the Rice factor of the radio link via which the received signal has been transmitted. The Rice factor is characteristic of the strength of a signal that has been transmitted via a line-of-sight path with respect to the strength of the signals which have been transmitted via non-line-of-sight paths. In the case of multipath signal propagation, the Rice factor is in consequence a measure of the quality or the reliability of the radio link for the position-finding process to be carried out. The Rice factor is proportional to the ratio between the signal strength of the line-of-sight component and the variance of the multipath component.

The determination unit uses the estimated Rice factor to determine the threshold value, which is then used by the detection unit for the threshold value comparison.

In comparison to conventional receivers for position-finding systems, the receiver according to the invention has the advantage that it is more sensitive. The greater sensitivity results from the relationship between the threshold value and the estimated Rice factor. If, by way of example, the Rice factor indicates that the line-of-sight component is highly dominant in comparison to the non-line-of-sight component, then a different threshold value can be chosen than in the opposite situation, in which the line-of-sight component is weak. In the end, this leads to an increased probability of a location signal being detected. In contrast to conventional receivers, the receiver according to the invention in consequence uses a-priori information in order to calculate an optimum threshold value.

The determination unit can be designed such that it first of all uses the estimated Rice factor to calculate the probability density (probability density function) of the received signal after being processed by coherent and non-coherent integration in the receiver. The threshold value of the detector is then calculated on the basis of the probability density, taking into account the Rice factor.

As an alternative to the embodiment of the determination unit described above, it is possible to provide for the determination unit to read the threshold value from a table once it has calculated the probability density. The values of the probability density are stored with the associated threshold values in this table. The table is preferably created before the position-finding process is carried out.

A further alternative for determination of the threshold value is formed with a table which directly lists the detector threshold values for the estimated Rice factors. This table is also preferably created before the position-finding process is carried out, on the basis of previously calculated probability densities.

According to one particularly preferred refinement of the receiver according to the invention, a value is permanently predetermined for the incorrect detection probability. The incorrect detection probability represents the probability of a signal which is not a synchronized location signal being incorrectly regarded as a location signal by the detector unit. This occurs, for example, in the situation in which the random noise that is produced other than by location signals is unfortunately combined such that it produces a statistical value which is above the threshold value. With the present preferred embodiment of the receiver according to the invention, the calculation of the threshold value includes not only the estimated Rice factor but also the value for the incorrect detection probability.

A further particularly preferred embodiment of the receiver according to the invention provides for the calculation unit to contain a series circuit which comprises a first integrator for coherent integration, a magnitude squaring or magnitude forming device and a second integrator for non-coherent integration. Sample values of the received signal, produced by an analogue/digital converter, are entered in the series circuit. The statistical values can be tapped off at the output of the series circuit.

It is also advantageous for the transmitters to spread-code the location signals. In this case, the calculation unit has a unit for despreading the received signal.

Fundamentally, there are a number of possible ways to output from the reception path values from which the Rice factor is intended to be estimated. By way of example, the statistical values generated by the calculation unit can be supplied to the estimation unit in order to use them to derive the Rice factor. As an alternative to this, the values produced by the despreading unit can be supplied to the estimation unit.

The Rice factor can be estimated using the methods which are specified in the German Patent Application "Verbesserung der Zuverlässigkeit und der Genauigkeit von Positionsbestimmungs-Verfahren durch Abschätzung des Rice-Faktors einer Funkverbindung" [Improvement in the reliability and accuracy of position-finding methods by estimation of the Rice factor of a radio link], which is held in the German Patent and Trademark Office under the file reference 10 2004 027 666.8. The cited patent application is hereby included in the disclosure content of the present patent application.

The Rice factor can be determined, for example, using the following equations (1) and (2), where R is the amplitude of sample values of the received signal, and $\hat{E}\{x\}$ is approximated by forming a running average of x:

$$\hat{K}_s \approx \frac{\hat{E}\{R^2\} - 2 \cdot \hat{E}\{(R - \hat{E}\{R\})^2\}}{2 \cdot \hat{E}\{(R - \hat{E}\{R\})^2\}} \quad (1)$$

$$\hat{K}_{2,4} = \frac{\hat{E}\{R^4\} - 2 \cdot (\hat{E}\{R^2\})^2 - \hat{E}\{R^2\} \cdot \sqrt{2 \cdot (\hat{E}\{R^2\})^2 - \hat{E}\{R^4\}}}{(\hat{E}\{R^2\})^2 - \hat{E}\{R^4\}} \quad (2)$$

The position-finding system may be a satellite-based system. In this case, the transmitters are fitted to the satellites that are used in the respective system. In particular, the position-finding system may be a GPS system, a GLONASS system or a Galileo system. However, in principle, it may also be a purely terrestrial position-finding system with terrestrial radio sources. Position-finding systems such as these may be based, for example, on the "time of arrival" (TOA), "time difference of arrival" (TDOA) or "enhanced observed time difference" (E-OTD) evaluation methods. The cited evaluation methods can also be implemented in American European or Asiatic mobile radio systems, such as GSM, GPRS, EDGE, UMTS, DCS-1800, IS-136, IS-95, PCS-1900, CDMA-2000 and PDC.

The method according to the invention is used for finding the position of a receiver which is part of a position-finding system.

In the method according to the invention, a statistical value is compared with a threshold value. For this purpose, the statistical value is first of all calculated on the basis of a signal that has been received by the receiver. Furthermore, the Rice factor of the radio link via which the received signal has been transmitted is estimated. The estimated Rice factor is used to calculate the threshold value. The result of the said comparison can then be used to determine whether the received signal is a synchronized location signal and/or whether the received signal is used for finding the position of the receiver.

The method according to the invention has the same advantages over conventional position-finding methods as the receiver according to the invention.

BRIEF DESCRIPTION OF THE DRAWINGS

The invention will be explained in more detail in the following text using examples and with reference to the drawings, in which.

DETAILED DESCRIPTION

Figure 1:
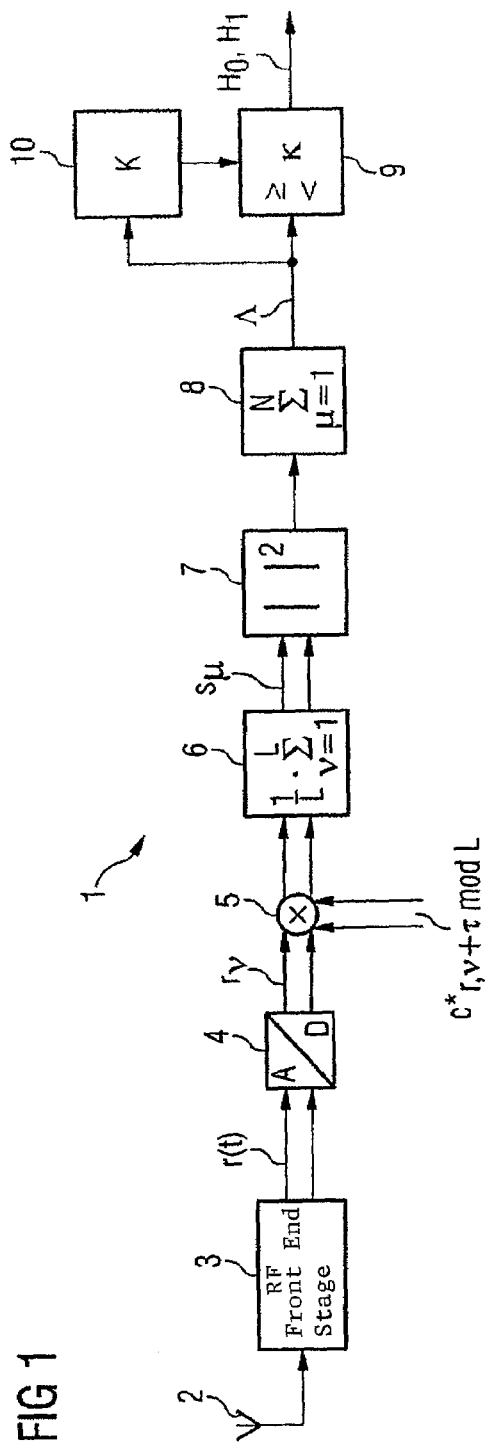
FIG. 1 shows a block diagram of a receiver 1 as a first exemplary embodiment of the receiver according to the invention.

FIG. 1 shows the block diagram of a receiver 1 for a position-finding system. In the present case, this is a GPS system. The location signals which are transmitted from the satellites of the GPS system are received by an antenna 2, which is followed by an RF frontend stage 3. The RF frontend stage 3 emits the quadrature component of the complex envelope r(t) of a received location signal in baseband:

$$r(t) = \sqrt{2C} \cdot d(t) \cdot c(t) \cdot \exp(j \cdot \Delta\phi(t)) + n(t) \quad (3)$$

In equation (3), d(t) represents the data signal, c(t) the received spreading code, $\Delta\phi(t)=\phi(t)-\phi_r(t)$ the phase offset between the received signal phase $\phi(t)$ and the reference phase $\phi_r(t)$, and n(t) the complex additive white Gaussian noise (AWGN) with a mean value of zero.

After being processed by the RF frontend stage 3, the received location signal is sampled ($v \in Z$) at times (v) by an analogue/digital converter 4 which is arranged downstream from the RF frontend stage 3. The sample values $r_v$ are despread by using a multiplier 5 to multiply them by the complex-conjugate local PRN reference spread code $c^*_{T,v+\tau modL}$. The products which are obtained from this process are added in a coherent integrator 6 using the following equation (4):

$$s_\mu = \frac{1}{L} \cdot \sum_{v=1}^{L} r_v \cdot c^*_{r,v+\tau\,mod\,L} \quad (4)$$

$$= \sqrt{2C} \cdot d_\mu \cdot \frac{1}{L} \cdot \sum_{v=1}^{L} c_v \cdot c^*_{r,v+\tau\,mod\,L} \cdot \exp(j \cdot \Delta\varphi_v) +$$

$$\frac{1}{L} \cdot \sum_{v=1}^{L} n_v \cdot c^*_{r,v+\tau\,mod\,L}$$

The parameter $L=T_c/T_s$ ($L \in N$) indicates the ratio between the coherent integration time $T_c$ and the sampling period $T_s$.

The addition process carried out in equation (4) results in:

$$s_\mu = \sqrt{2C} \cdot d_\mu \cdot \frac{1}{L} \cdot R_{rc}(\tau) \cdot si\left(\Delta\omega \cdot \frac{T_c}{2}\right) \cdot \exp(j \cdot \Delta\Phi) + w_\mu \quad (5)$$

In equation (5), $R_{rc}(\tau)$ indicates the circular cross-correlation function between $c_v$ and $C_{r,v+\tau modL}$, $\Delta\omega$ indicates the frequency offset after removal of the Doppler, and $w_\mu = w_{I,\mu} + j \cdot w_{Q,\mu}$ indicates the resultant complex additive white Gaussian noise with a mean value of zero. The expected values of $E\{w_I^2\}$ and $E\{w_Q^2\}$ are given by:

$$E\{w_I^2\} = E\{w_Q^2\} = E\left\{\left(\frac{1}{L} \cdot \sum_{v=1}^{L} n_I \cdot c^*_{r,v+\tau\,mod\,L}\right)^2\right\} \quad (6)$$

$$= E\left\{\left(\frac{1}{L} \cdot \sum_{v=1}^{L} n_Q \cdot c^*_{r,v+\tau\,mod\,L}\right)^2\right\} = \sigma_w^2 = \frac{N_0}{T_c}$$

The values $s_\mu$ which are emitted from the coherent integrator 6 are passed to a magnitude squaring and magnitude forming device 7, and are then passed to a non-coherent integrator 8. $N=T_n/T_c$ values are added up in the non-coherent integration process, with $T_n$ indicating the non-coherent integration time. When equation (5) is divided by $\sigma_w^2$, the in-phase component $w_I$ and the quadrature component $w_Q$ of the additive white Gaussian noise assume a standard normal distribution with a variance of one. The non-coherent integrator 8 emits the statistical value $\Lambda_{AWGN}$ shown below:

$$\Lambda_{AWGN} = \sum_{\mu=1}^{N} \frac{|s_{AWGN,\mu}|^2}{\sigma_w^2} \underset{H_0}{\overset{H_1}{\gtrless}} \kappa_{AWGN} \quad (7)$$

The statistical value $\Lambda_{AWGN}$ is compared with a threshold value $\kappa_{AWGN}$ in a downstream detector 9. Provided that $\Lambda_{AWGN} \geq \kappa_{AWGN}$ it is assumed that a hypothesis $H_1$ is valid, on the basis of which the received signal is a location signal that has been transmitted by a satellite and has the tested code phase $\tau$. In the converse situation, that is to say where $\Lambda_{AWGN} < \kappa_{AWGN}$, a hypothesis $H_0$ is valid, which states that the signal received at the antenna 2 is not a synchronized location signal which has the tested code phase $\tau$.

The method of operation of the detector 9 is based on the Neyman-Pearson criterion, which maximizes the probability of detection of the location signal provided that a fixed rate is predetermined for incorrect detection, in which case a signal is incorrectly considered to be the synchronized location signal with the tested code phase $\tau$.

The probability $P_f$ of incorrect detection is calculated as follows:

$$P_f = \int_\kappa^\infty p_{\Lambda|H_0}(s|H_0)ds \quad (8)$$

The threshold value κ is calculated using equation (8) by predetermining a fixed value, for example $10^{-3}$, for the probability $P_f$.

The probability $P_d$ for the detection of the location signal is given by the following equation:

$$P_d = \int_\kappa^\infty p_{\Lambda|H_1}(s|H_1)ds \tag{9}$$

The probability Pd can be calculated as a function of the quotient $C/N_0$, where C is the signal carrier power and $N_0 = k \cdot T_0$ is the noise power spectral density. In this case, $k = 1.38 \cdot 10^{-23}$ J/K is the Boltzmann constant, and $T_0 = 290$ K is room temperature The above equations result in a non-central $\chi^2$ distribution function for the probability density (probability density function) $p_\Lambda$:

$$p_{\Lambda_{AWGN}}(s) = \frac{1}{\sigma_w} \cdot \chi_M^2\left(\frac{s}{\sigma_w}, \gamma^2\right) \tag{10}$$

$$= \frac{1}{2\sigma_w} \cdot \left(\frac{s}{\sigma_w \cdot \gamma^2}\right)^{\frac{M-2}{4}} \cdot$$

$$\exp\left(-\frac{s}{2\sigma_w} - \frac{\gamma^2}{2}\right) \cdot I_{\frac{M}{2}-1}\left(\sqrt{\frac{s \cdot \gamma^2}{\sigma_w}}\right)$$

$I_{M/2-1}(x)$ is the modified Bessel function of the first type and (M/2-1)-th order. The number $M_{AWGN}$ of degrees of freedom of the $\chi^2$ distribution function in equation (10) and the non-centrality parameter $\gamma^2_{AWGN}$ are calculated as follows:

$$M_{AWGN} = 2 \cdot \frac{T_n}{T_c} \tag{11}$$

$$\gamma^2_{AWGN} = \sum_{v=1}^M \gamma_v^2 = \sum_{\mu=1}^{\frac{T_n}{T_c}} \frac{1}{\sigma_w^2} \cdot \tag{12}$$

$$[E\{\text{Re}\{s_{AWGN,\mu}\}\}^2 + E\{\text{Im}\{s_{AWGN,\mu}\}\}^2]$$

$$= \frac{C}{N_0} \cdot 2T_n \cdot \frac{1}{L^2} \cdot R_{rc}^2(\tau) \cdot si^2\left(\Delta\omega_\mu \cdot \frac{T_c}{2}\right)$$

To the extent that the receiver 1 has been described so far, it corresponds to conventional receivers for GPS systems which are optimized for channels with additive white Gaussian noise. However, according to the invention, the receiver 1 also has an estimation unit 10 for estimation of the Rice factor K.

Provided that the received signal has a dominant, stationary signal component, that is to say a signal component which is not subject to fading, as the line-of-sight signal, the envelope of the received signal has a Rice distribution. Furthermore, the Rice multipath channel produces a complex white Gaussian noise variable u with a mean value of zero, which occurs as a multiplicative factor in the conditional equation of the envelope r(t) of the received location signal. The envelope x of the variable u is given by:

$$x = |u| = \sqrt{u_I^2 + u_Q^2} \tag{13}$$

According to "Probability, Random Variables and Stochastic Processes" by A. Papoulis and A. U. Pillai, published by McGraw-Hill, New York, 2002 the envelope x follows the following Ricean fading distribution $p_x(x)$:

$$p_x(x) = \frac{x}{\sigma_u^2} \cdot \exp\left(-\frac{x^2 + A_u^2}{2\sigma_u^2}\right) \cdot I_0\left(\frac{A_u \cdot x}{\sigma_u^2}\right) \tag{14}$$

$I_0(x)$ is the modified Bessel function of the first type and zero order. $A_u^2$ is the signal strength of the line-of-sight component:

$$A_u^2 = E\{u_I\}^2 + E\{u_Q\}^2 \tag{15}$$

The Rice factor K is defined as the ratio between the signal strength of the line-of-sight component and the variance of the multipath component:

$$K = \frac{A_u^2}{2\sigma_u^2} \tag{16}$$

Furthermore, the complex envelope of the Rice multipath channel in baseband is given by:

$$r(t) = \sqrt{2C} \cdot c(t) \cdot \exp(j \cdot \Delta\phi(t)) \cdot u(t) + n(t) \tag{17}$$

Furthermore:

$$E\{|u|^2\} = A_u^2 + 2\sigma_u^2 = 1 \tag{18}$$

$$E\{u_I^2\} = E\{u_Q^2\} = \frac{1}{2} \tag{19}$$

$$E\{u_I\} = E\{u_Q\} = \sigma_U \cdot \sqrt{K} = \sqrt{\frac{K}{2 \cdot (K+1)}} \tag{20}$$

$$E\{(u_I - E\{u_I\})^2\} = E\{(u_Q - E\{u_Q\})^2\} = \sigma_u^2 = \frac{1}{2 \cdot (K+1)} \tag{21}$$

The values $s_\mu$ which are emitted from the coherent integrator 6 in the case of a Rice distribution are given by the following equation:

$$s_\mu = \sqrt{2C} \cdot d_\mu \cdot \frac{1}{L} \cdot R_{rc}(\tau) \cdot si\left(\Delta\omega \cdot \frac{T_c}{2}\right) \cdot \exp(j \cdot \Delta\Phi) \cdot u_\mu + w_\mu \tag{22}$$

The addition of the two Gaussian variables with mean values not equal to zero in equation (22) produces a further Gaussian variable with a mean value not equal to zero. The Gaussian variable which is obtained from the said addition process can be normalized in order to produce a normal distribution not equal to zero and with a variance of one.

The threshold value decision to be made by the detector 9 is in the following form:

$$\Lambda_{Rice} = \sum_{\mu=1}^N \frac{|s_{Rice,\mu}|^2}{\sigma_{Ri}^2} \begin{matrix} H_1 \\ \geq \\ < \\ H_0 \end{matrix} \kappa_{Rice} \tag{23}$$

$\sigma_{Ri}^2$ is given by:

$$\sigma_{Ri}^2 = C \cdot \frac{1}{L^2} \cdot R_{rc}^2(\tau) \cdot si^2\left(\Delta\omega \cdot \frac{T_c}{2}\right) \cdot \frac{1}{K+1} + \frac{N_0}{T_c} \quad (24)$$

From the above equations, the probability density (probability density function) $p\Lambda_{Rice}$ has a non-central $\chi^2$ distribution function, as follows:

$$p_{\Lambda_{Rice}}(s) = \frac{1}{\sigma_{Ri}} \cdot \chi_M^2\left(\frac{s}{\sigma_{Ri}}, \gamma^2\right) \quad (25)$$

$$= \frac{1}{2\sigma_{Ri}} \cdot \left(\frac{s}{\sigma_{Ri} \cdot \gamma^2}\right)^{\frac{M-2}{4}} \cdot$$

$$\exp\left(-\frac{s}{2\sigma_{Ri}} - \frac{\gamma^2}{2}\right) \cdot I_{\frac{M}{2}-1}\left(\sqrt{\frac{s \cdot \gamma^2}{\sigma_{Ri}}}\right)$$

$I_{M/2-1}(x)$ is the modified Bessel function of the first type and (M/2-1)th order. The number $M_{Rice}$ of degrees of freedom of the $\chi^2$ distribution function in equation (25) and the non-centrality parameter $\gamma^2_{Rice}$ are calculated as follows:

$$M_{Rice} = 2 \cdot \frac{T_n}{T_c} \quad (26)$$

$$\gamma_{Rice}^2 = \sum_{v=1}^{M} \gamma_v^2 = \sum_{\mu=1}^{\frac{T_n}{T_c}} \frac{1}{\sigma_{Ri}^2} \cdot [E\{\text{Re}\{s_{Rice,\mu}\}\}^2 + E\{\text{Im}\{s_{Rice,\mu}\}\}^2] \quad (27)$$

$$= \sum_{\mu=1}^{\frac{T_n}{T_c}} \frac{1}{\sigma_{Ri}^2} \cdot C \cdot \left(\frac{1}{L} \cdot R_{rc}(\tau)\right)^2 \cdot si^2\left(\Delta\omega_\mu \cdot \frac{T_c}{2}\right) \cdot \frac{K}{K+1}$$

$$= \frac{K \cdot T_n}{T_c} \cdot \left(1 + \frac{N_0 \cdot (K+1)}{T_c \cdot C \cdot R_{rc}^2(\tau_\mu) \cdot si^2\left(\Delta\omega_\mu \cdot \frac{T_c}{2}\right)}\right)^{-1}$$

If the dominant line-of-sight signal becomes weaker, the Rice distribution breaks down to a Rayleigh distribution, and the Rice factor K assumes the value zero. The conditional equations for the probability density $p\Lambda_{Rayleigh}$ for a Rayleigh distribution are thus in the following form:

$$p_{\Lambda_{Rayleigh}}(s) = \frac{1}{\sigma_{Ra}} \cdot \chi_M^2\left(\frac{s}{\sigma_{Ra}}\right) \quad (28)$$

$$= \frac{1}{2\sigma_{Ra}} \cdot \frac{\exp\left(-\frac{s}{2\sigma_{Ra}}\right) \cdot \left(\frac{s}{\sigma_{Ra}}\right)^{\frac{M}{2}-1}}{2^{\frac{M}{2}} \cdot \Gamma\left(\frac{M}{2}\right)}$$

where:

$$\Gamma\left(\frac{M}{2}\right) = \int_0^\infty x^{\frac{M}{2}-1} \cdot e^{-x} dx \quad (29)$$

$$\sigma_{Ra}^2 = C \cdot \frac{1}{L^2} \cdot R_{rc}^2(\tau) \cdot si^2\left(\Delta\omega \cdot \frac{T_c}{2}\right) + \frac{N_0}{T_c} \quad (30)$$

The invention provides for the Rice factor K to be estimated, and for the optimum threshold value κ to be calculated on the basis of the Rice factor K. The optimum threshold value κ can be calculated by means of equations (8) and (25) provided that a fixed value, for example $10^{-3}$, is predetermined for the probability $P_f$ in accordance with the Neyman-Pearson criterion. The estimation unit 10 is provided in FIG. 1, for estimation of the Rice factor K. The threshold value K can be calculated either in the estimation unit 10 or in the detector 9.

Figure 2:
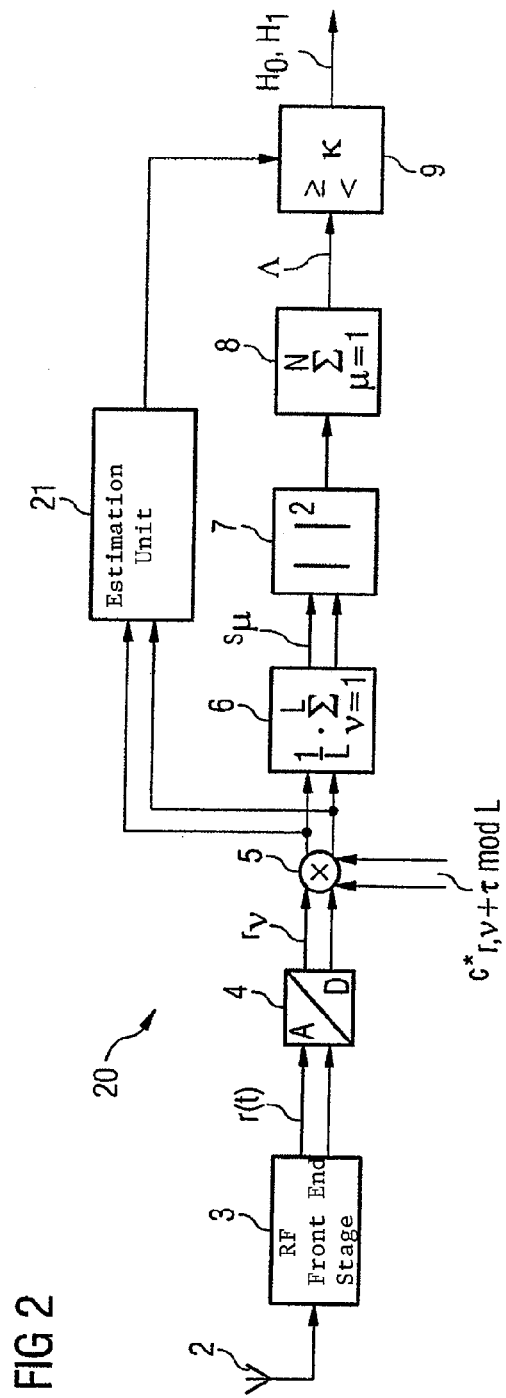
FIG. 2 shows a block diagram of a receiver 20, as a second exemplary embodiment of the receiver according to the invention.
Figure 3A:
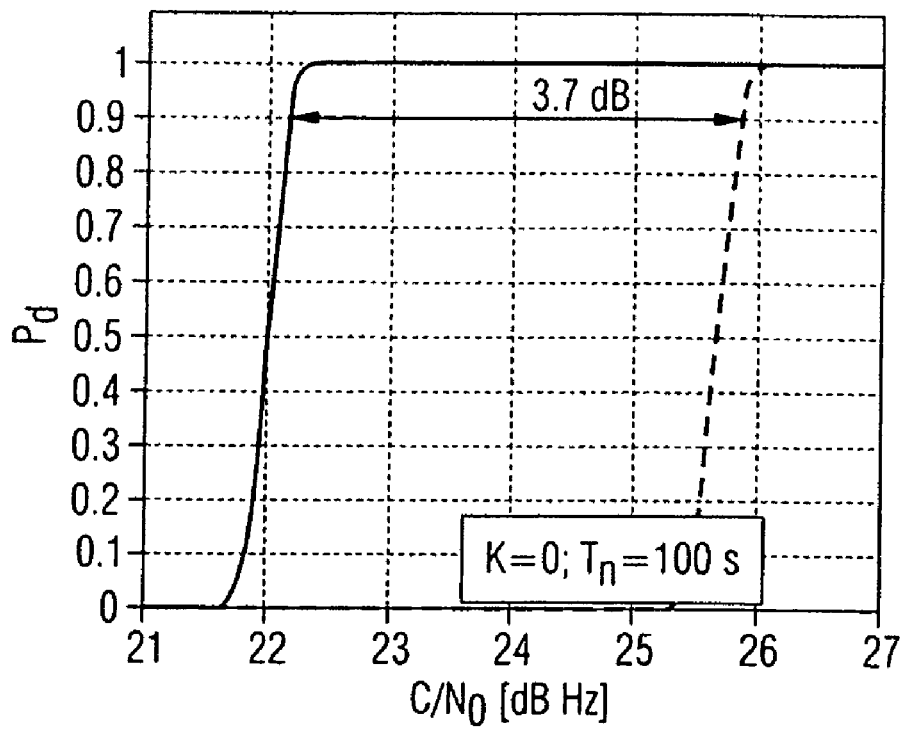
FIGS. 3a to 8b show graphs of the probability $P_d$ for the detection of the location signal plotted against the ratio $C/N_0$ of the signal carrier power C and the noise power spectral density $N_0$.
Figure 3B:
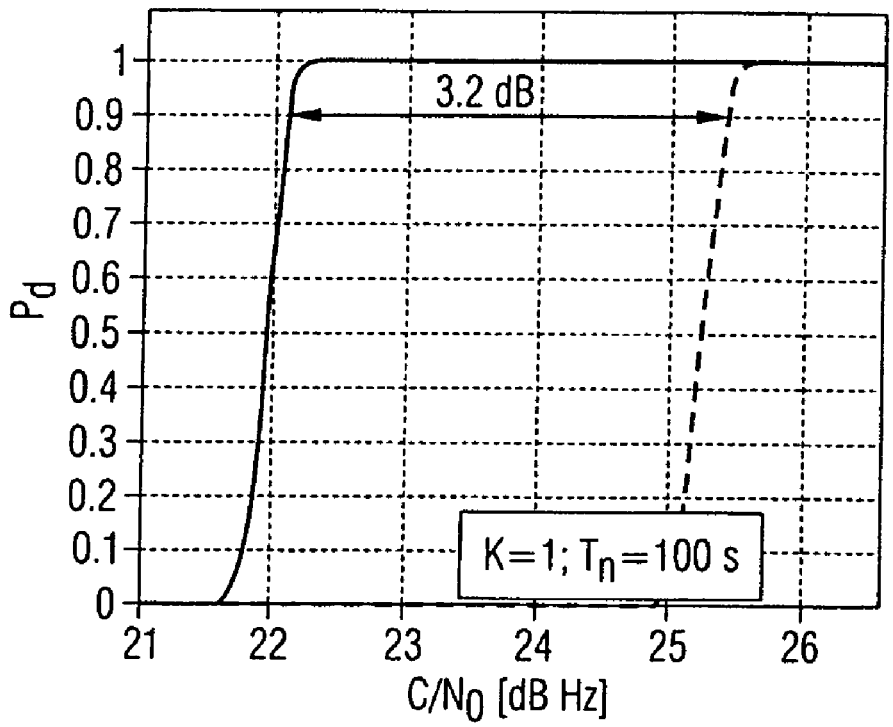
Figure 4A:
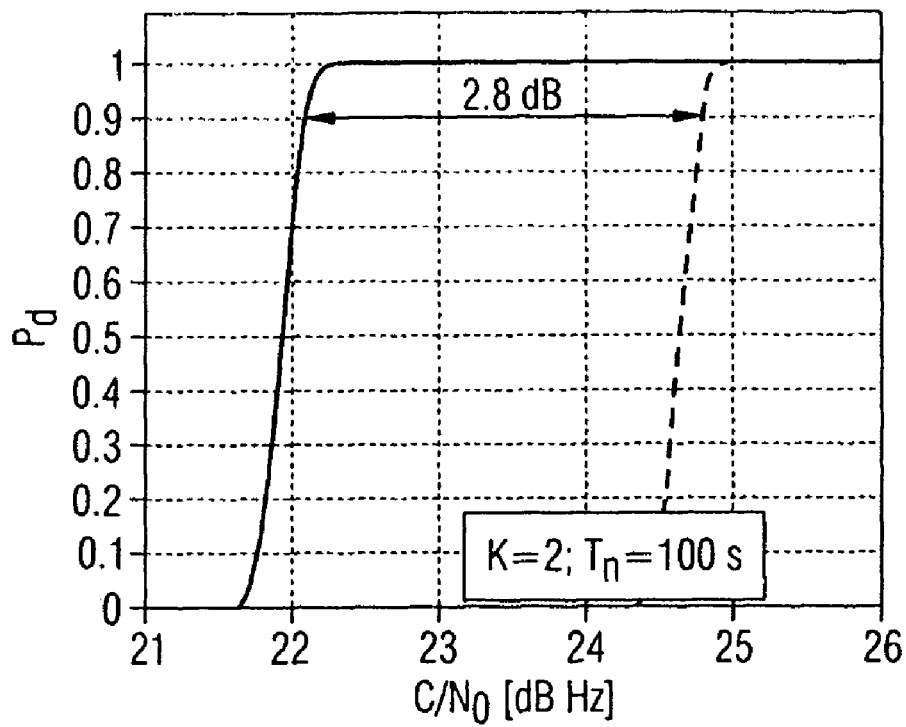
Figure 4B:
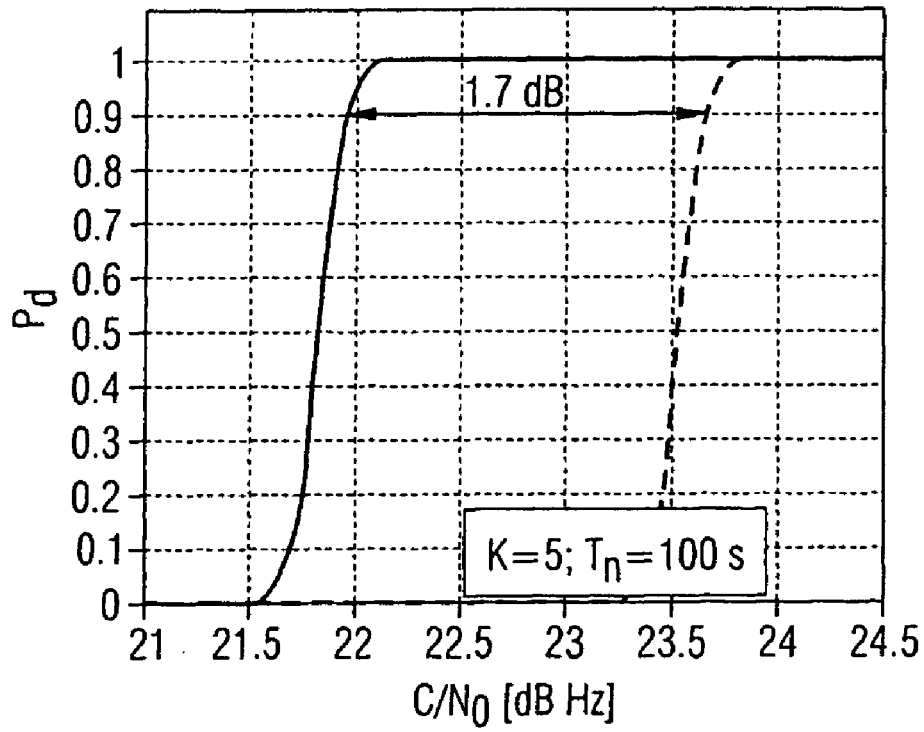
Figure 5A:
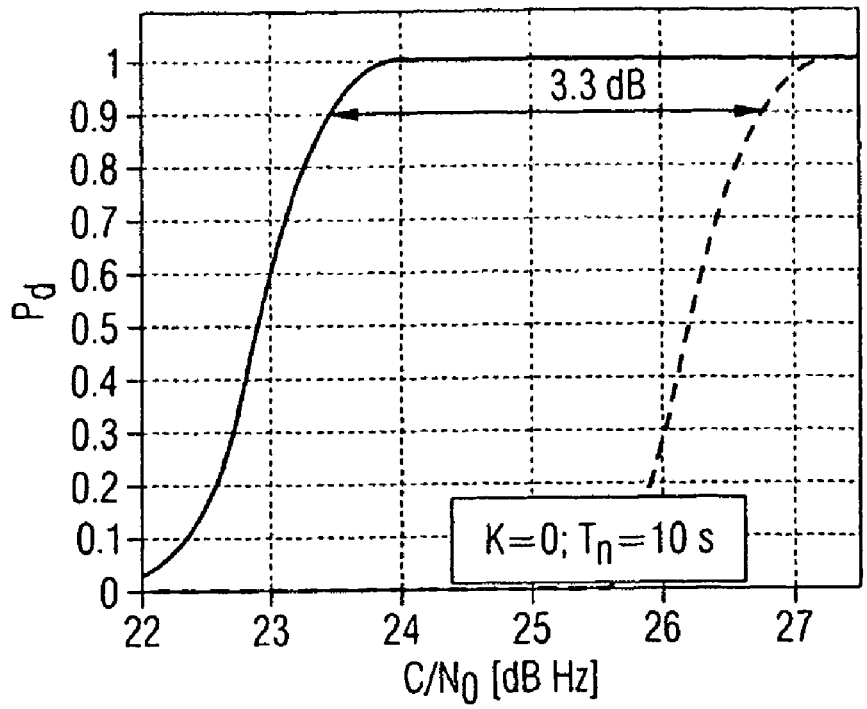
Figure 5B:
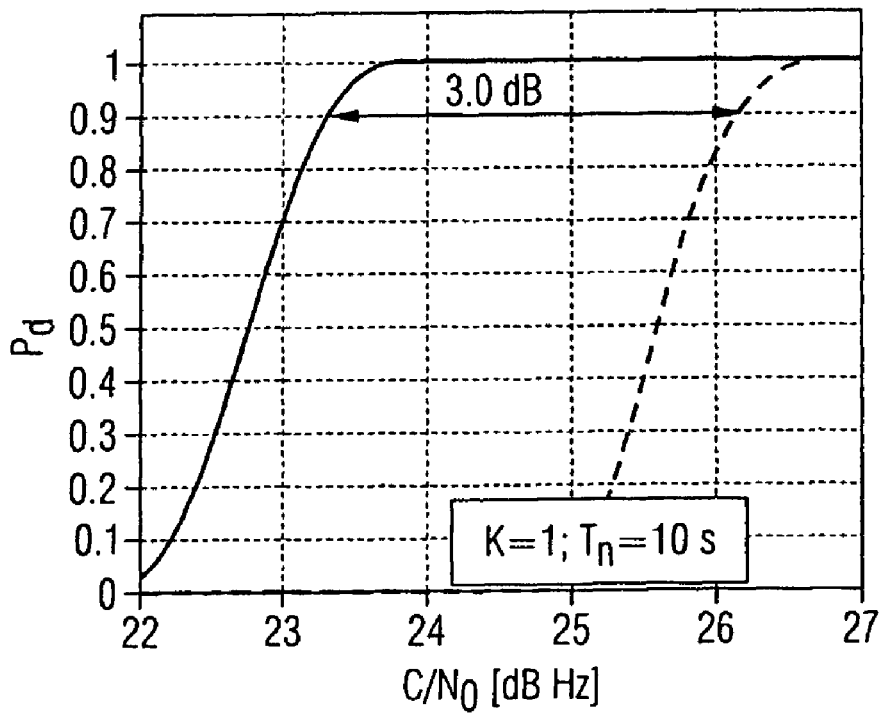
Figure 6A:
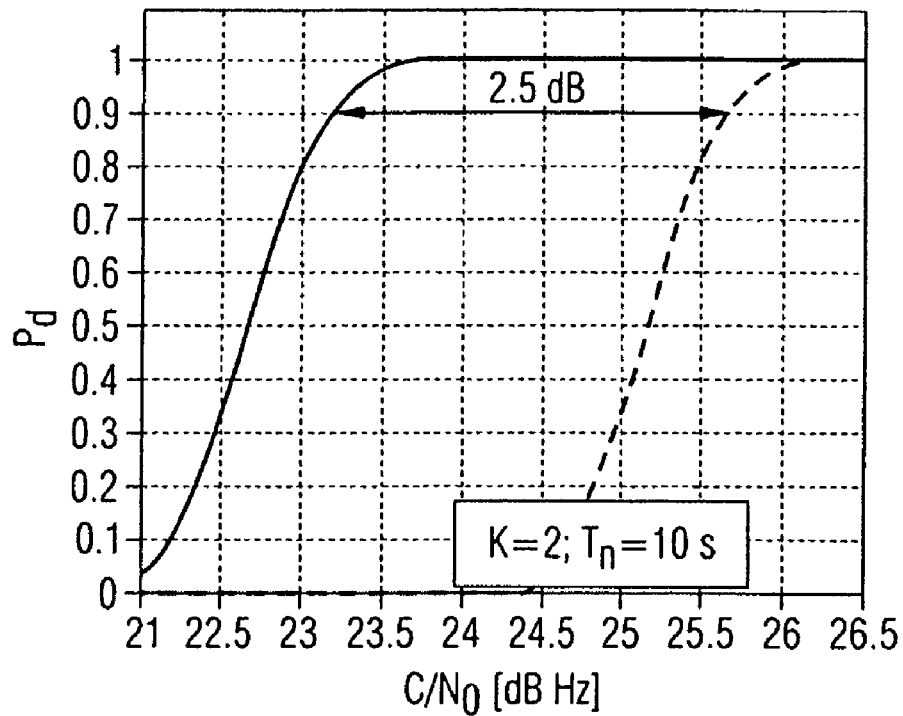
Figure 6B:
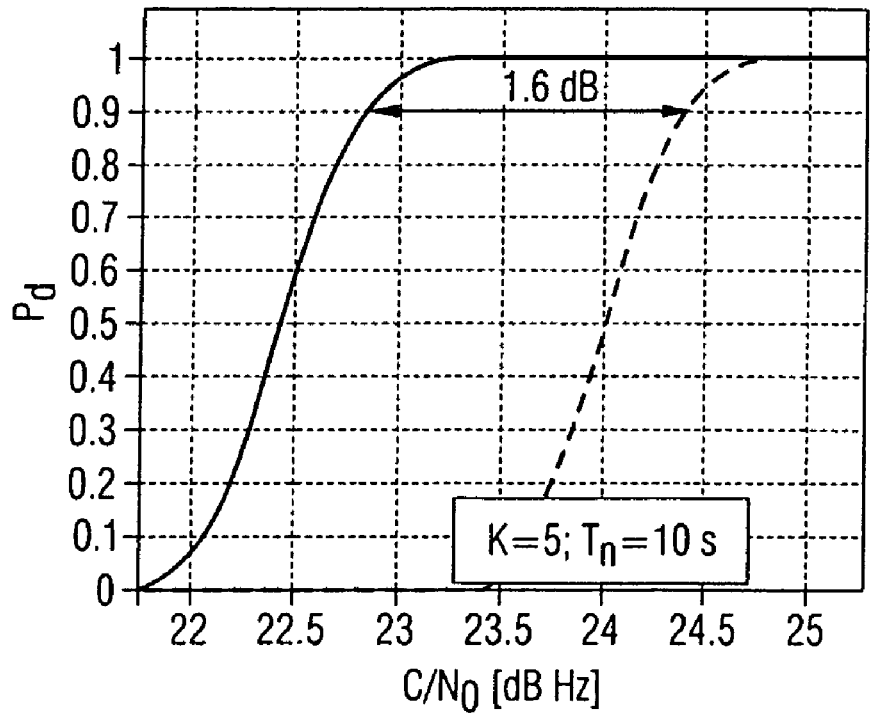
Figure 7A:
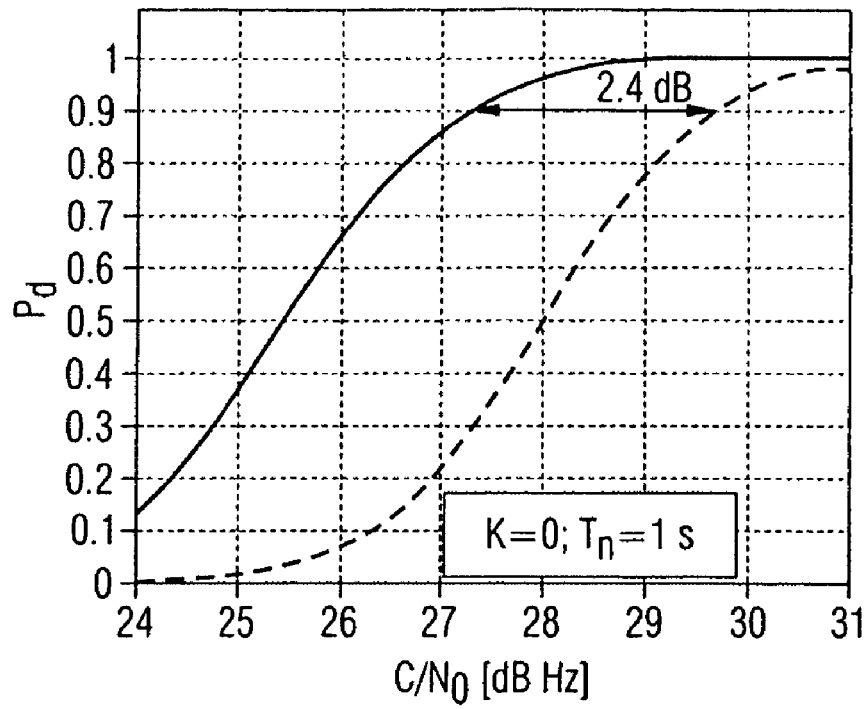
Figure 7B:
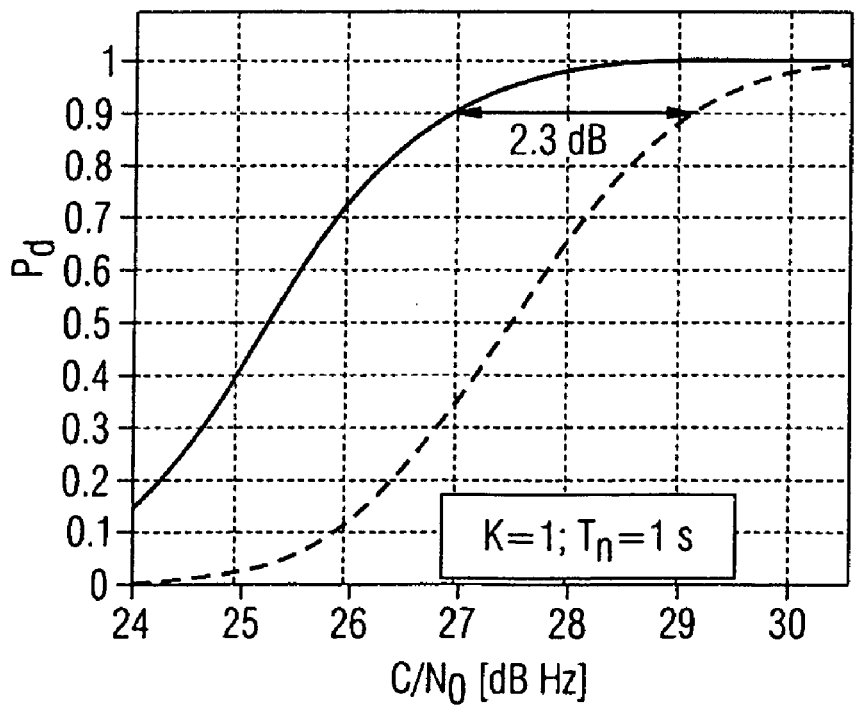
Figure 8A:
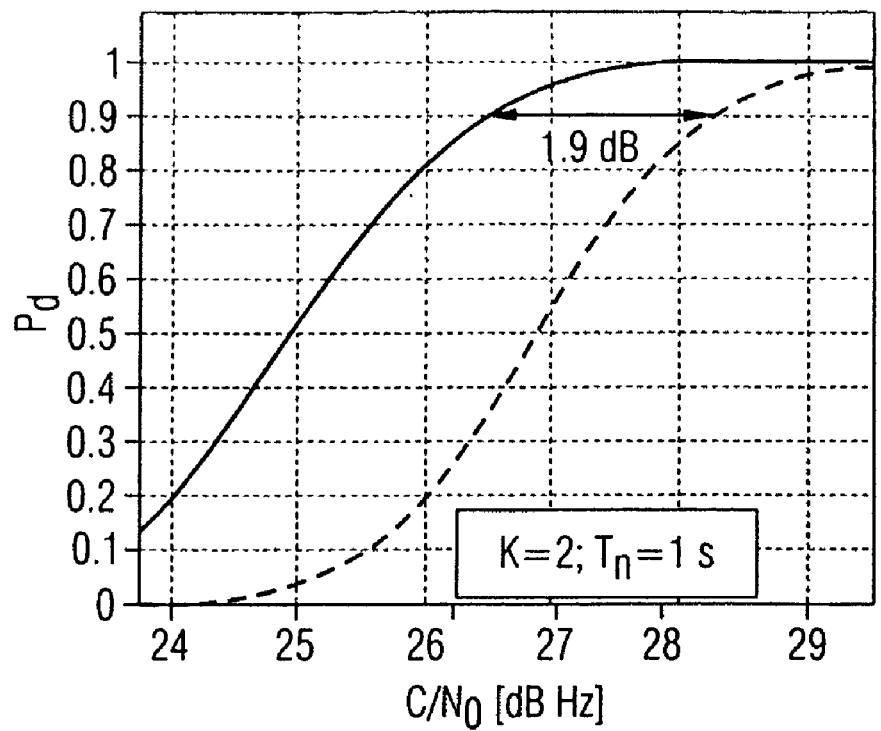
Figure 8B:
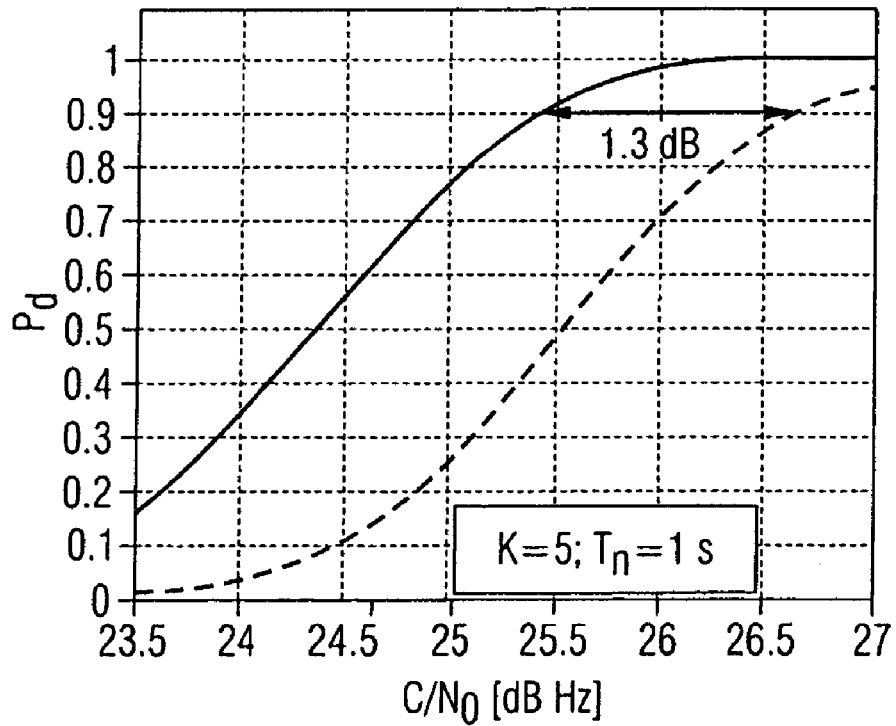

In FIG. 1, provision is made for the estimation unit 10 to be fed from the non-coherent integrator 8. As an alternative to this, an estimation unit for estimation of the Rice factor K may also follow the multiplier 5. The block diagram of a receiver 20 such as this is illustrated in FIG. 2. The receiver 20 differs from the receiver 1 illustrated in FIG. 1 only by the arrangement of the estimation unit 21 and the correspondingly different internal design of the estimation unit 21 in comparison to the estimation unit 10. As an alternative to the two options that have been mentioned, the estimation unit may also be fed from the coherent integrator 6 or from the magnitude squaring and magnitude forming device 7.

The invention leads to a considerable improvement in the sensitivity of the receiver. The longer the non-coherent integration time $T_n$ and the lower the Rice factor K are, the greater is the sensitivity in comparison to conventional receivers. For example, a non-coherent integration time $T_n$ of 10 seconds and a Rice factor K of 1 result in a sensitivity gain of 3.0 dB.

Further examples for the increase in sensitivity are shown in FIGS. 3a, 3b to 8a, 8b. In the figures that have been mentioned, the probability $P_d$ for the detection of the location signal is in each case plotted against the ratio $C/N_0$ of the signal carrier power C to the noise power spectral density $N_0$. The dashed curves indicate the probability $P_d$ for a conventional receiver, while the solid curves indicate the probability $P_d$ applicable to a receiver according to the invention. $P_f=10^{-3}$ and $T_c=20$ ms were set for calculation of the curves shown in FIGS. 3a to 8b. In the present case, the process of finding the position of the receiver is based on the GPS L1-C/A Standard.

One method for estimation of the Rice factor K will be explained in the following text. This method is described in the German Patent Application, which has already been mentioned above, with the file reference 10 2004 027 666.8.

The method for estimation of the Rice factor K is based on the second and fourth non-central moments of the Rice distribution. In an entirely general form, the non-central moment of the Rice distribution can be given by the following equation:

$$E\{R^n\} = 2^{\frac{n}{2}} \cdot \sigma^n \cdot \Gamma\left(\frac{n}{2}+1\right) \cdot \exp\left(-\frac{A^2}{2\sigma^2}\right) \cdot {}_1F_1\left(\frac{n}{2}+1; 1; \frac{A^2}{2\sigma^2}\right) \quad (31)$$

In equation (31), ${}_1F_1(x;y;z)$ represents the confluent hyper-geometric function. The linear non-central moments of the Rice distribution are simplified to form conventional moments. Thus, in particular:

$$E\{R^2\} = A^2 + 2\sigma^2 \quad (32)$$

$$E\{R^4\} = A^4 + 8\sigma^2 A^2 + 8\sigma^4 \quad (33)$$

The definition of the Rice factor K has already been stated above:

$$K = \frac{A^2}{2\sigma^2} \quad (34)$$

Since all the individual moments of the Rice distribution depend on σ and K, an auxiliary function is defined which now depends only on the Rice factor K:

$$f_{n,m}(K) = \frac{(E\{R^n\})^m}{(E\{R^m\})^n} \quad (35)$$

$$f_{2,4}(K) = \frac{(E\{R^2\})^4}{(E\{R^4\})^2} = \left[\frac{(K+1)^2}{K^2+4K+2}\right]^2 \quad (36)$$

Solving equation (36) for K results in a non-negative solution, which provides an indicated estimate of the Rice factor K:

$$\hat{K}_{2,4} = \frac{\hat{E}\{R^4\} - 2 \cdot (\hat{E}\{R^2\})^2 - \hat{E}\{R^2\} \cdot \sqrt{2 \cdot (\hat{E}\{R^2\})^2 - \hat{E}\{R^4\}}}{(\hat{E}\{R^2\})^2 - \hat{E}\{R^4\}} \quad (37)$$

The described method is distinguished by rapid convergence and a low level of implementation complexity.

Figure 9:
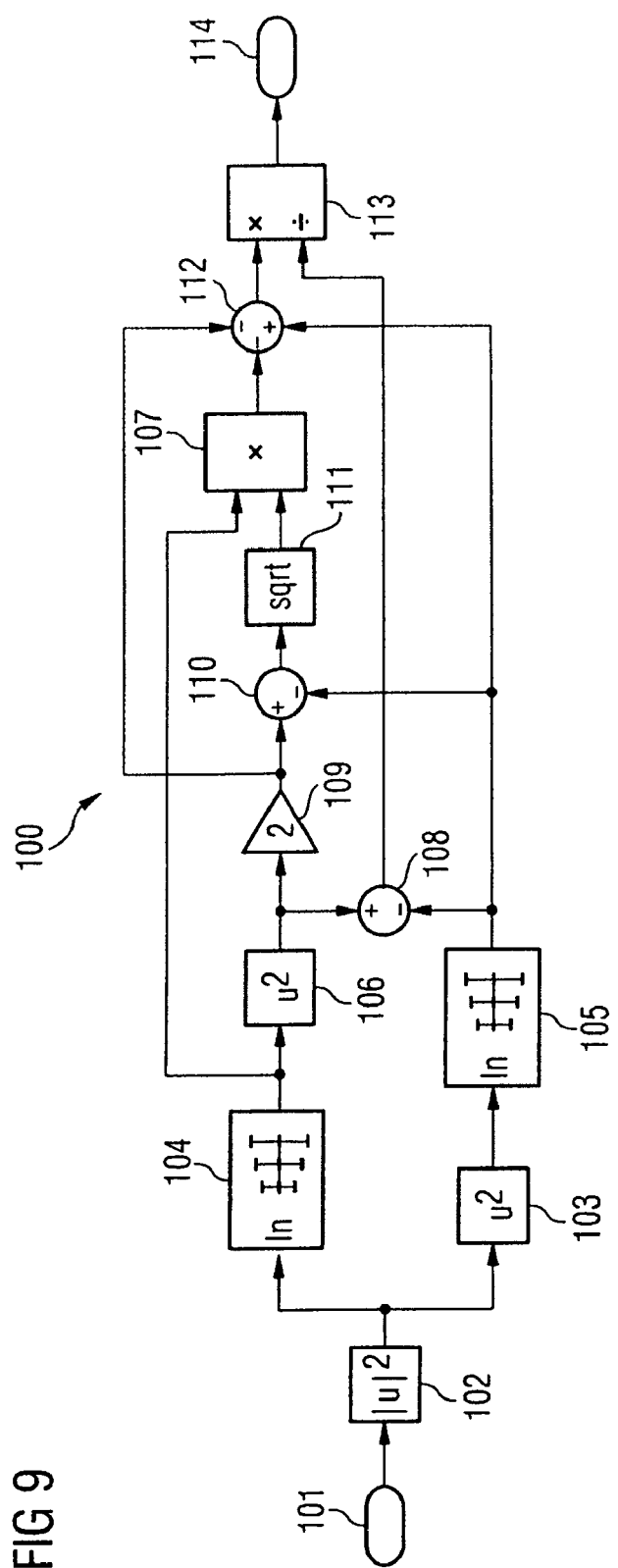
FIG. 9 shows a block diagram of an estimation apparatus 100 for estimation of the Rice factor.

FIG. 9 shows a block diagram of an estimation apparatus 100 for estimation of the Rice factor K using the above equation (37).

As shown in the block diagram illustrated in FIG. 9, signal values are entered in the estimation apparatus 100 via an input 101. The signal values are first of all passed to a magnitude squaring device 102. Its output is connected to the input of a squaring device 103 and to the input of a running averaging device 104. The running averaging device 104 produces approximate values for the terms $\hat{E}\{R^2\}$ which occur in the equation (37). The output of the squaring device 103 is passed to the input of a running averaging device 105. The running averaging device 105 produces approximate values for the terms $\hat{E}\{R^4\}$ which occur in the equation (37). The output of the running averaging device 104 is passed to the input of a squaring device 106 and to the first input of a multiplier 107. The output of the squaring device 106 is passed to the first input of an adder 108, while the output of the running averaging device 105 is passed to the second input of the adder 108 with a negative mathematical sign. The output of the squaring device 106 is also passed to a times-two multiplier 109, whose output is passed to a first input of an adder 110, whose second input is passed to the output of the running averaging device 105 with a negative mathematical sign. The output of the adder 110 is connected to a square-rooting device 111, whose output is connected to the second input of the multiplier 107. The output of the multiplier 107 is passed to a first input of an adder 112 with a negative mathematical sign, and the output of the times-two multiplier 109 is passed with a negative mathematical sign to a second input of the adder 112, while the output of the running averaging device 105 is passed to a third input of the adder 112. The output of the adder 112 is passed to the multiplier input of a combined multiplier/divider 113, while the output of the adder 108 is passed to the divider input. The multiplier input is supplied with the enumerator of the right-hand expression from the equation (37), while the denominator is passed to the divider input. The output of the combined multiplier/divider 113 produces the estimated value of the Rice factor K. The estimated value can be tapped off at the output 114 of the estimation apparatus 100.

Figure 10A:
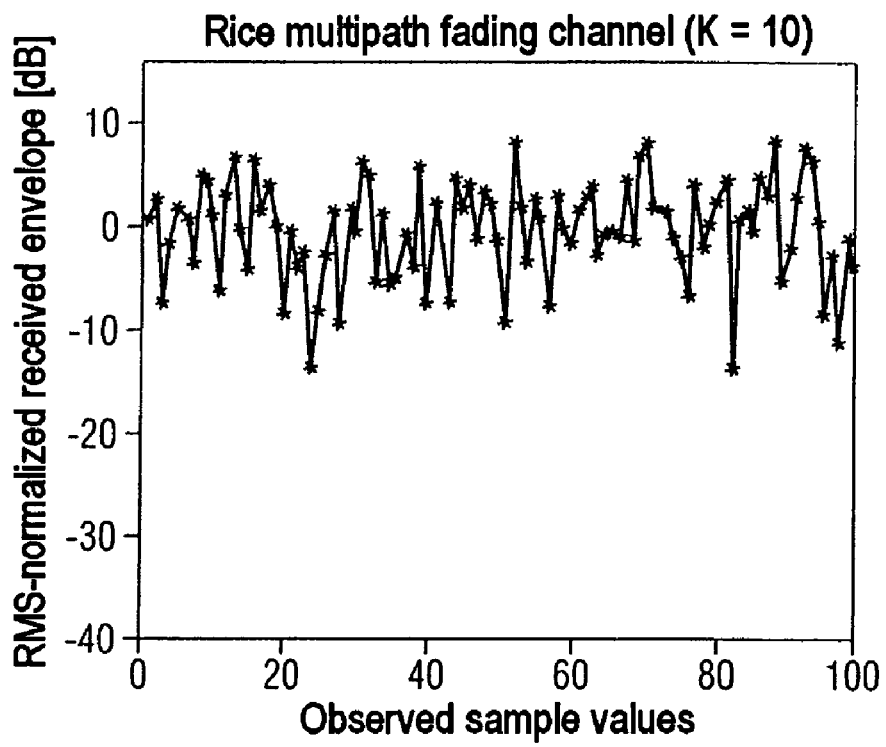
FIGS. 10a to 11b show graphs illustrating the results of the simulated estimation of the Rice factor.
Figure 10B:
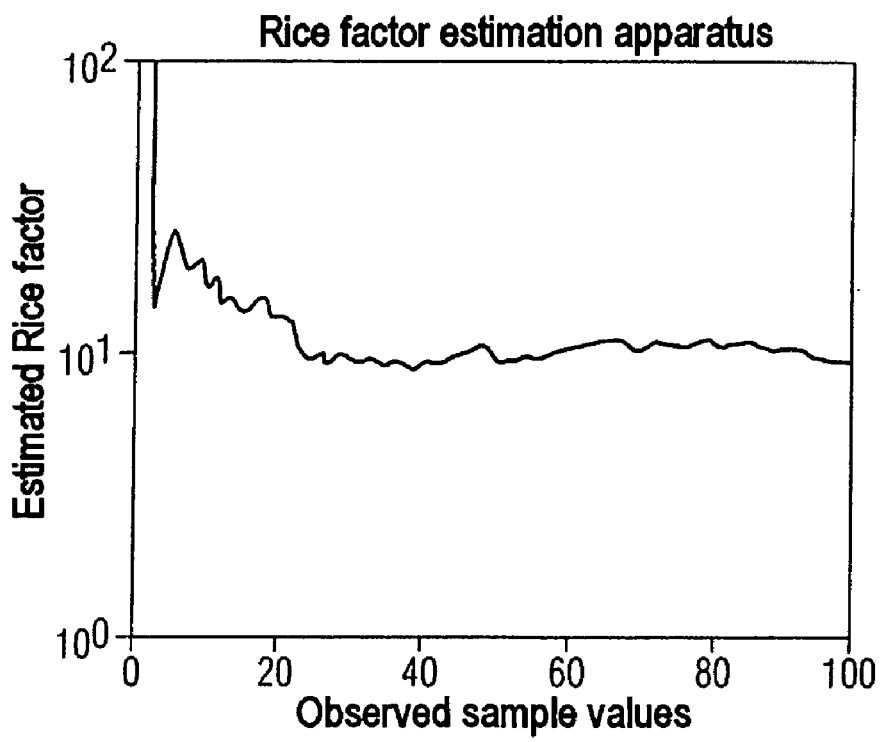
Figure 11A:
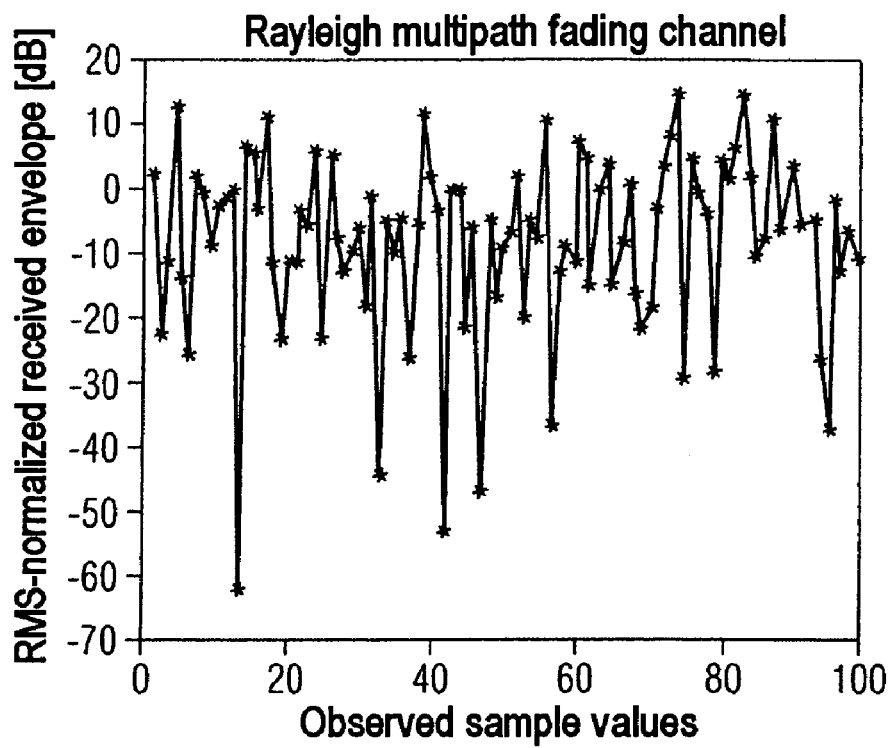

FIGS. 10a, 10b as well 11a, 11b illustrate two convergence simulations for estimation of the Rice factor K. While the simulation that is illustrated in FIGS. 10a and 10b shows a process with a Rice distribution for which K=10, the simulation which is illustrated in FIGS. 11a and 11b shows a process with a Rayleigh distribution for which, in consequence, K=0.

Figure 11B:
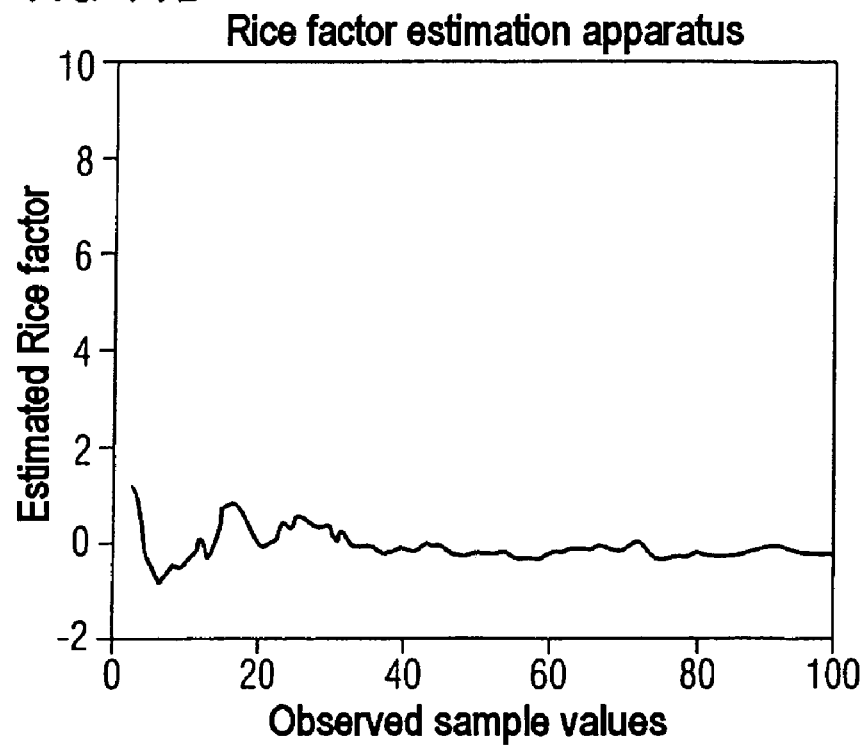

As can be seen from FIG. 10b, the Rice factor estimated using the equation (37) converges to the value K=10, while FIG. 11b shows that the Rice factor approximates to the value 0.

What is claimed is:

1. A receiver for a position-finding system, which is based on the evaluation of different delay times of location signals, wherein the location signals are transmitted from two or more transmitters with known positions and being received by the receiver, the receiver comprising:
    a calculation unit for calculation of a statistical value on the basis of a signal which is received by the receiver,
    a detector unit, which is designed such that it compares the statistical value with a threshold value and determines on the basis of the comparison whether the received signal is a location signal and/or whether the received signal is used for finding the position of the receiver,
    an estimation unit for estimation of the Rice factor of the radio link via which the received signal was transmitted, and
    a determination unit for determination of the threshold value on the basis of the estimated Rice factor.

2. A receiver according to claim 1, wherein
the determination unit is designed such that it calculates the probability density of the received, in particular preprocessed, signal on the basis of the estimated Rice factor, and that it calculates the threshold value on the basis of this probability density.

3. A receiver according to claim 1, wherein
the determination unit is designed such that it calculates the probability density of the received, in particular preprocessed, signal on the basis of the estimated Rice factor, and that it determines the threshold value on the basis of this probability density by means of a table.

4. A receiver according to claim 1, wherein
the determination unit is designed such that it determines the threshold value on the basis of the estimated Rice factor by means of a table.

5. A receiver according to claim 1, wherein
the determination unit is designed such that it calculates the threshold value on the basis of a predetermined fixed incorrect detection probability, with the incorrect detection probability being the probability that the received signal is not a synchronized location signal but is considered by the detector unit to be a location signal.

6. A receiver according to claim 1, wherein
in the calculation unit, sample values of the received signal feed a series circuit which has a first integrator for coherent integration, a magnitude squaring or magnitude forming device and a second integrator for non-coherent integration.

7. A receiver according to claim 1, wherein
the location signals which are transmitted by the transmitters are spread-coded, and
a despreading unit is provided in the calculation unit, for despreading the received signal.

8. A receiver according to claim 1, wherein
the estimation unit for estimation of the Rice factor is fed with the statistical value from the calculation unit, or with the despread sample values from the despreading unit.

9. A receiver according to claim 1, wherein
the Rice factor is estimated by the estimation unit using $$\hat{K}_s \approx \frac{\hat{E}\{R^2\} - 2 \cdot \hat{E}\{(R - \hat{E}\{R\})^2\}}{2 \cdot \hat{E}\{(R - \hat{E}\{R\})^2\}}$$

where R is the amplitude of sample values of the received signal, and $\hat{E}\{x\}$ is approximated by forming a running average of x.

10. A receiver according to claim 1, wherein
the Rice factor is estimated by the estimation unit using $$\hat{K}_{2,4} = \frac{\hat{E}\{R^4\} - 2 \cdot (\hat{E}\{R^2\})^2 - \hat{E}\{R^2\} \cdot \sqrt{2 \cdot (\hat{E}\{R^2\})^2 - \hat{E}\{R^4\}}}{(\hat{E}\{R^2\})^2 - \hat{E}\{R^4\}}$$

where R is the amplitude of sample values of the received signal, and $\hat{E}\{x\}$ is approximated by forming a running average of x.

11. A receiver according to claim 1, wherein
the transmitter of the position-finding system is arranged on satellites or terrestrially.

12. A method for finding the position of a receiver in a position-finding system, which is based on the evaluation of different delay times of location signals, wherein the location signals are being transmitted by two or more transmitters with known positions, and being received by the receiver, the method comprising the steps of:
   (a) calculating a statistical value on the basis of a signal which is received by the receiver;
   (b) comparing the statistical value with a threshold value;
   (c) determining on the basis of the result of the comparison whether the received signal is a location signal and/or whether the received signal is used for finding the position of the receiver,
   (d) estimating the Rice factor of the radio link via which the received signal has been transmitted; and
   (e) determining the threshold value on the basis of the estimated Rice factor.

13. A method according to claim 12, wherein
the probability density of the received, in particular preprocessed, signal is calculated on the basis of the estimated Rice factor in step (e), and
the threshold value is calculated on the basis of this probability density.

14. A method according to claim 12, wherein
the probability density of the received, in particular preprocessed, signal is calculated on the basis of the estimated Rice factor in step (e), and the threshold value is determined on the basis of this probability density by means of a table.

15. A method according to claim 12, wherein
the threshold value is determined on the basis of the estimated Rice factor by means of a table in step (e).

16. A method according to claim 12, wherein
the threshold value is calculated on the basis of a predetermined fixed incorrect detection probability, with the incorrect detection probability being the probability that the received signal is not a synchronized location signal but is considered in step (c) to be a location signal.

17. A method according to claim 12, wherein
sample values of the received spread-coded signal are despread in step (a),
the despread sample values are integrated coherently,
the squares of the magnitudes of the results of the coherent integration are formed, and
the squares of the magnitudes are integrated non-coherently.

18. A method according to claim 12, wherein
the Rice factor is estimated on the basis of the statistical value or on the basis of despread sample values, or on the basis of coherently integrated despread sample values, or on the basis of the magnitude of coherently integrated despread sample values.

19. A method according to claim 12, wherein
the Rice factor is estimated using $$\hat{K}_s \approx \frac{\hat{E}\{R^2\} - 2 \cdot \hat{E}\{(R - \hat{E}\{R\})^2\}}{2 \cdot \hat{E}\{(R - \hat{E}\{R\})^2\}}$$

where R is the amplitude of sample values of the received signal, and $\hat{E}\{x\}$ is approximated by forming a running average of x.

20. A method according to claim 12, wherein
the Rice factor is estimated using $$\hat{K}_{2,4} = \frac{\hat{E}\{R^4\} - 2 \cdot (\hat{E}\{R^2\})^2 - \hat{E}\{R^2\} \cdot \sqrt{2 \cdot (\hat{E}\{R^2\})^2 - \hat{E}\{R^4\}}}{(\hat{E}\{R^2\})^2 - \hat{E}\{R^4\}}$$

where R is the amplitude of sample values of the received signal, and $\hat{E}\{x\}$ is approximated by forming a running average of x.

21. A method according to claim 12, wherein
the transmitters of the position-finding system are arranged on satellites or terrestrially.

* * * * *